(12) United States Patent
Uno

(10) Patent No.: US 10,766,311 B2
(45) Date of Patent: Sep. 8, 2020

(54) PNEUMATIC TIRE

(71) Applicant: Sumitomo Rubber Industries, Ltd., Kobe-shi, Hyogo (JP)

(72) Inventor: Hiroki Uno, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 274 days.

(21) Appl. No.: 15/920,732

(22) Filed: Mar. 14, 2018

(65) Prior Publication Data

US 2018/0264891 A1    Sep. 20, 2018

(30) Foreign Application Priority Data

Mar. 15, 2017  (JP) .................................. 2017-050210

(51) Int. Cl.
  *B60C 11/04* (2006.01)
  *B60C 11/12* (2006.01)
  *B60C 11/03* (2006.01)

(52) U.S. Cl.
  CPC ...... *B60C 11/1236* (2013.01); *B60C 11/0304* (2013.01); *B60C 11/0306* (2013.01); *B60C 11/0332* (2013.01); *B60C 11/04* (2013.01); *B60C 11/1259* (2013.01); *B60C 11/1263* (2013.01); *B60C 2011/039* (2013.01); *B60C 2011/0365* (2013.01); *B60C 2011/0381* (2013.01); *B60C 2011/1209* (2013.01); *B60C 2011/1254* (2013.01)

(58) Field of Classification Search
  CPC ..... B60C 2011/1254; B60C 2011/0341; B60C 11/04
  See application file for complete search history.

(56) References Cited

U.S. PATENT DOCUMENTS

| | | | |
|---|---|---|---|
| 6,026,874 A * | 2/2000 | Shibata | B60C 11/0083 152/209.18 |
| 6,595,253 B2 * | 7/2003 | Ikeda | B60C 11/0318 152/209.15 |
| 2008/0236714 A1 * | 10/2008 | Kojima | B60C 11/0332 152/209.9 |
| 2011/0308676 A1 | 12/2011 | Morozumi | |

(Continued)

FOREIGN PATENT DOCUMENTS

| | | | | |
|---|---|---|---|---|
| EP | 2716477 A1 * | 4/2014 | ......... | B60C 11/0304 |
| JP | 2004-9999 A | 1/2004 | | |

(Continued)

OTHER PUBLICATIONS

Extended European Search Report for European Application No. 18158988.8, dated Jun. 25, 2018.

*Primary Examiner* — Robert C Dye
*Assistant Examiner* — Farah Taufiq
(74) *Attorney, Agent, or Firm* — Birch, Stewart, Kolasch & Birch, LLP

(57) ABSTRACT

A pneumatic tire includes a tread portion including an inboard shoulder land portion defined between an inboard tread edge and an inboard shoulder main groove. The inboard shoulder land portion is provided with inboard semi-open shoulder lateral grooves and inboard shoulder sipes extending axially inwardly from the inboard tread edge and terminate within the inboard shoulder land portion.

20 Claims, 9 Drawing Sheets

(56) References Cited

U.S. PATENT DOCUMENTS

| | | | |
|---|---|---|---|
| 2013/0186532 A1* | 7/2013 | Kujime | B60C 11/0304 |
| | | | 152/209.8 |
| 2014/0230980 A1 | 8/2014 | Guichon et al. | |
| 2014/0283967 A1* | 9/2014 | Inoue | B60C 11/12 |
| | | | 152/209.18 |
| 2015/0202928 A1 | 7/2015 | Akashi et al. | |

FOREIGN PATENT DOCUMENTS

| | | |
|---|---|---|
| JP | 2011-225084 A | 11/2011 |
| JP | 2012-001161 A | 1/2012 |
| WO | WO 2008/096498 A1 | 8/2008 |

\* cited by examiner

PNEUMATIC TIRE

TECHNICAL FIELD

The present invention relates to a pneumatic tire, more particularly to a tread pattern of a pneumatic tire suitable for a sports car.

BACKGROUND ART

There have been proposed pneumatic tires for sports cars suitable for high speed running in a racing circuit as well as normal traveling on public roads. Usually, such a pneumatic tire is provided in the tread portion with less grooves in order to provide a high tread-pattern rigidity, therefore, the tread portion is increased in the ground contacting area and generates a high cornering force or cornering power during running. Thus, the tire can exhibit highly increased limit performance during cornering.

On the other hand, during cornering, the ground-contacting part of the tread portion (or land portion) stands for a greater force from the road surface, generating a large grip force, therefore, once the tread portion loses the road grip as a result of exceeding the maximum friction coefficient, the tread portion suddenly begins to slip on the road surface. Thus, such tire for sports cars has room for improvement in vehicle control performance in critical cornering conditions.

SUMMARY OF THE INVENTION

The present invention was made in view of the circumstances described above, and a main object of the present invention is to provide a pneumatic tire in which the vehicle control performance in critical running conditions is improved while maintaining high limit performance.

According to the present invention, a pneumatic tire comprises:

a tread portion having an outboard tread edge to be positioned away from the center of a vehicle body and an inboard tread edge to be positioned close to the center of the vehicle body, the tread portion provided with main grooves extending continuously in the tire circumferential direction, and comprising an inboard shoulder land portion defined between the inboard tread edge and an inboard shoulder main groove which is the main groove on the most inboard tread edge side, the inboard shoulder land portion provided with inboard semi-open shoulder lateral grooves and inboard shoulder sipes disposed between the inboard semi-open shoulder lateral grooves, wherein the inboard semi-open shoulder lateral grooves extend axially inwardly from the inboard tread edge and terminate without reaching the inboard shoulder main groove so as to have axially inner ends within the inboard shoulder land portion, and the inboard shoulder sipes extend axially inwardly from the inboard tread edge and terminate without reaching the inboard shoulder main groove so as to have axially inner ends positioned within the inboard shoulder land portion.

The pneumatic tire according to the present invention may have the following features (1)-(10):
(1) the inboard semi-open shoulder lateral grooves are arranged in the tire circumferential direction at a pitch of not less than 20% of a maximum ground-contacting length in the tire circumferential direction of the tread portion under a normally inflated loaded condition of the tire;
(2) at least two of the inboard shoulder sipes are disposed between every two of the circumferentially adjacent inboard semi-open shoulder lateral grooves;
(3) axial lengths of the inboard shoulder sipes are not less than 10 mm;
(4) the axial distance between the inboard shoulder main groove and the axially inner ends of the inboard semi-open shoulder lateral grooves is not less than 10 mm;
(5) the depth of the inboard shoulder sipes is in a range from 50% to 100% of the depth of the inboard semi-open shoulder lateral grooves;
(6) the bottom of each of the inboard shoulder sipes comprises a slope part which extends from the axially inner end of the sipe at the ground contacting top surface of the inboard shoulder land portion to the deepest position of the sipe, and
the slope part is inclined at an angle of not less than 30 degrees with respect to a normal line drawn normally to the ground contacting top surface of the inboard shoulder land portion at the axially inner end of the sipe in a cross section along the longitudinal direction of the inboard shoulder sipe;
(7) the groove widths of the inboard semi-open shoulder lateral grooves are gradually increased toward the axially outside from the respective axial inner ends;
(8) the axial distance between the inboard shoulder main groove and the axial inner ends of the inboard shoulder sipes is in a range from 80% to 125% of the axial distance between the inboard shoulder main groove and the axial inner ends of the inboard semi-open shoulder lateral grooves;
(9) an inboard middle land portion defined between the inboard shoulder main groove and an inboard middle main groove which is the main groove next to the inboard shoulder main groove, is provided with
inboard open-ended middle lateral grooves extending from the inboard shoulder main groove to the inboard middle main groove, and
inboard semi-open middle lateral grooves extending from the inboard shoulder main groove toward the inboard middle main groove but terminating without reaching the inboard middle main groove, and
the inboard semi-open middle lateral grooves are closer to the inboard semi-open shoulder lateral grooves than the inboard open-ended middle lateral grooves;
(10) a maximum ground-contacting length in the tire circumferential direction of the tread portion under a normally inflated loaded condition of the tire is not more than 70% of a maximum ground-contacting width in the tire axial direction of the tread portion under the normally inflated loaded condition of the tire.

The tread edges (To and Ti) are the axial outermost edges of the ground contacting patch of the tire which occurs under a normally inflated loaded condition when the camber angle of the tire is zero.

The tread width (Tw) is the width measured under a normally inflated unloaded condition, as the axial distance between the tread edges To and Ti determined as above.

The normally inflated unloaded condition is such that the tire is mounted on a standard wheel rim and inflate to a standard pressure but loaded with no tire load.

The normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of the tire refer to those under the normally inflated unloaded condition of the tire unless otherwise noted.

In this application, the term "sipe" means a narrow groove having a width of not more than 1.0 mm inclusive of a cut having no substantial width. Therefore. the term "groove" means that having a groove width greater than 1 mm.

DESCRIPTION OF THE PREFERRED EMBODIMENTS

Figure 1:
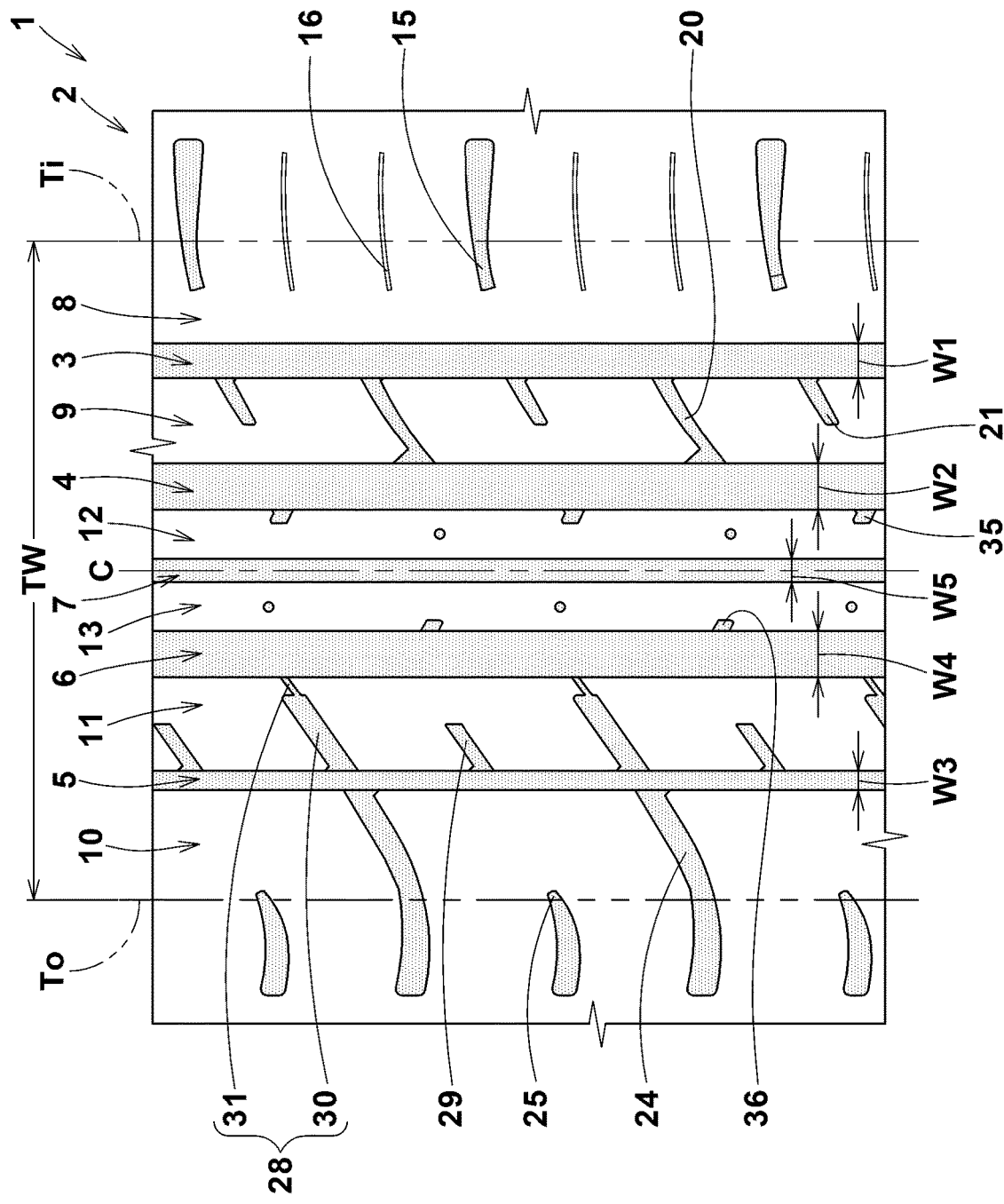
FIG. 1 is a development view of a tread portion of a pneumatic tire as an embodiment of the present invention.

Embodiments of the present invention will now be described in detail in conjunction with accompanying drawings.

Each of the following embodiments is a pneumatic tire 1 designed for sports cars and being suitable for high speed running in racing circuits as well as normal traveling on public roads.

As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

In each of the following embodiments, the tread portion 2 is provided with a tread pattern which is asymmetric about the tire equator C, and the mounting position of the tire 1 with respect to a vehicle is specified. For example, the sidewall portion of the tire to be located on outside when installed on the vehicle is provided with an indication representing "outside", and the sidewall portion to be located on inside is provided with an indication representing "inside".

Accordingly, the tread portion 2 has an outboard tread edge (To) to be positioned away from the center of the vehicle body and an inboard tread edge Ti to be positioned close to the center of the vehicle body.

According thereto, in this application, the terms "outboard" and "inboard" are used toward the outboard tread edge To and inboard tread edge Ti, respectively, to refer relative positions in the tire axial direction. The terms "axially inner", "axially inward" and the like are used toward the tire equator, and the terms "axially outer", "axially outward" and the like are used toward the adjacent tread edge in order to refer relative positions in the tire axial direction.

In each embodiment, the tread portion 2 is provided with main grooves extending continuously in the tire circumferential direction which are an inboard shoulder main groove 3, an inboard middle main groove 4, an outboard shoulder main groove 5, an outboard middle main groove 6 and a crown main groove 7.

The inboard shoulder main groove 3 is nearest to the inboard tread edge Ti. The inboard middle main grooves 4 is next nearest to the inboard tread edge Ti.

The outboard shoulder main groove 5 is nearest to the outboard tread edge To. The outboard middle main groove 6 is next nearest to the outboard tread edge To.

The crown main groove 7 is disposed between the inboard middle main groove 4 and the outboard middle main groove 6.

Each of the main grooves 3 to 7 is configured as a straight groove parallel with the tire circumferential direction in order to enhance the pattern rigidity of the land portions adjacent thereto and thereby to provide an excellent limit performance. But, the main grooves 3-7 may be nonlinear grooves such as wavy grooves and zigzag grooves.

In each embodiment, the crown main groove 7 is disposed on the tire equator C.

The groove width W1 of the inboard shoulder main groove 3 is set to be larger than the groove width W3 of the outboard shoulder main groove 5. Thus, the pattern rigidity of the land portions can be mitigated on the inboard tread edge Ti side than on the outboard tread edge To side, and the force received from the road surface during cornering for which the land portion on the inboard tread edge Ti side can stand is decreased. As a result, it becomes possible to increase the vehicle control performance in critical running conditions.

In order to smoothly remove a water film existing under the land portions near the tire equator C and thereby to improve the limit performance on wet roads, the groove widths W2 and W4 of the inboard middle main groove 4 and the outboard middle main groove 6 are preferably set to be larger than the groove widths W1 and W3 of the inboard shoulder main groove 3 and the outboard shoulder main groove 5 although the widths are not particularly limited to this arrangement.

The groove width W1 of the inboard shoulder main groove 3 is preferably set in a range from 3% to 7% of the tread width TW. The groove width W3 of the outboard shoulder main groove 5 is preferably set in a range from 1% to 4% of the tread width TW. The groove widths W2 and W4 of the inboard middle main groove 4 and the outboard middle main groove 6 are preferably set in a range from 5% to 10% of the tread width TW. The groove width W5 of the crown main groove 7 is preferably set in a range from 2% to 5% of the tread width TW.

The groove depth of each main groove 3 to 7 is preferably set in a range from 2 to 10 mm.

By the main grooves, the tread portion 2 is axially divided into:
an inboard shoulder land portion 8 between the inboard shoulder main groove 3 and the inboard tread edge Ti,
an inboard middle land portion 9 between the inboard shoulder main groove 3 and the inboard middle main groove 4,
an inboard crown land portion 12 between the inboard middle main groove 4 and the crown main groove 7,
an outboard crown land portion 13 between the outboard middle main groove 6 and the crown main groove 7,
an outboard middle land portion 11 between the outboard shoulder main groove 5 and the outboard middle main groove 6, and
an outboard shoulder land portion 10 between the outboard shoulder main groove 5 and the outboard tread edge To.

Figure 2:
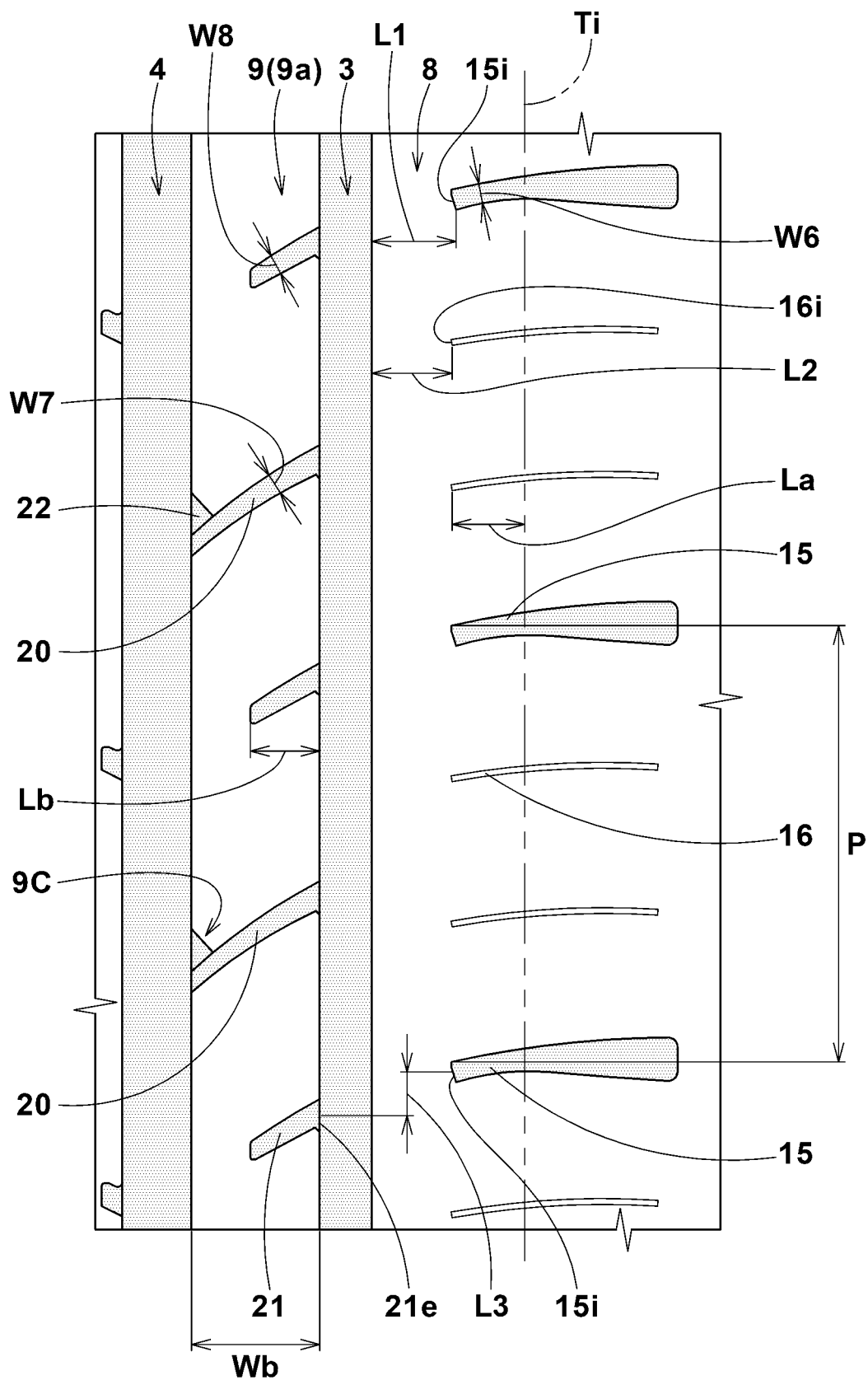
FIG. 2 is an enlarged view showing an inboard shoulder land portion and an inboard middle land portion of FIG. 1.

FIG. 2 partially shows the inboard shoulder land portion 8 and the inboard middle land portion 9 of the embodiment shown in FIG. 1.

The inboard shoulder land portion 8 is provided with inboard semi-open shoulder lateral grooves 15 and inboard shoulder sipes 16.

At least one inboard shoulder ripe 16 is disposed between every two of the circumferentially adjacent inboard semi-open shoulder lateral grooves 15.

Although the inboard semi-open shoulder lateral grooves 15 and the inboard shoulder sipes 16 are formed in the inboard shoulder land portion 8, the effect on deterioration in the grip performance is little in the tire positioned on the outside of the turn during cornering, therefore, the high limit performance can be maintained.

The inboard semi-open shoulder lateral grooves 15 and the inboard shoulder sipes 16 extend axially inwardly from the inboard tread edge Ti and terminate without reaching the inboard shoulder main groove 3.

Such an arrangement of the inboard semi-open shoulder lateral grooves 15 and the inboard shoulder sipes 16 moderately mitigates the pattern rigidity of the inboard shoulder land portion 8. Moreover, the inboard shoulder sipes 16 restrain the inboard shoulder land portion 8 from withstanding a large force during cornering, therefore, the occurrence of sudden skidding of the inboard shoulder land portion 8 is reduced. Accordingly, the tire 1 can be improved in the vehicle control performance in critical running conditions, while maintaining the high limit performance.

The inboard semi-open shoulder lateral grooves 15 and the inboard shoulder sipes 16 extend axially outwardly beyond the inboard tread edge Ti in order to mitigate the pattern rigidity in a region axially outside the inboard tread edge Ti which may be in contact with the ground during cornering.

The inboard semi-open shoulder lateral grooves 15 and the inboard shoulder sipes 16 are inclined to one side in the tire axial direction toward the tire equator C from the inboard tread edge Ti in order to moderately mitigate the pattern rigidity in the inboard shoulder land portion 8 and thereby to improve the vehicle control performance in critical running conditions.

The groove width W6 of the inboard semi-open shoulder lateral grooves 15 is increased towards the axially outside from the respective inner ends 15i in order to further mitigate the pattern rigidity in an inboard tread edge Ti side of the inboard shoulder land portion 8 and thereby to improve the vehicle control performance in critical running conditions.

The groove width W6 of the inboard semi-open shoulder lateral grooves 15 is gradually increased from the respective inner ends 15i to a position beyond the inboard tread edge Ti.

The groove width W6 of the inboard semi-open shoulder lateral grooves 15 is preferably set in a range from 30% to 50% of the groove width W1 of the inboard shoulder main groove 3. If the groove width W6 of the inboard semi-open shoulder lateral grooves 15 is less than 30% of the groove width W1 of the inboard shoulder main groove 3, then there is a possibility that the pattern rigidity of the inboard shoulder land portion 8 can not be mitigated effectively to improve the vehicle control performance in critical running conditions, and further the drainage performance is deteriorated.

If the groove width W6 of the inboard semi-open shoulder lateral grooves 15 is more than 50% of the groove width W1 of the inboard shoulder main groove 3, then there is a possibility that grip performance of the inboard shoulder land portion 8 is decreased and the limit performance is deteriorated.

The depth of the inboard semi-open shoulder lateral grooves 15 is preferably set in a range from 50% to 100% of the groove depth of the main grooves 3-7.

The axial distance L1 between the inboard shoulder main groove 3 and the axially inner ends 15i of the inboard semi-open shoulder lateral grooves 15 is preferably set in a range of not less than 10 mm, more preferably not less than 18 mm in order to prevent the grip performance of the inboard shoulder land portion 8 from decreasing.

Figure 3:
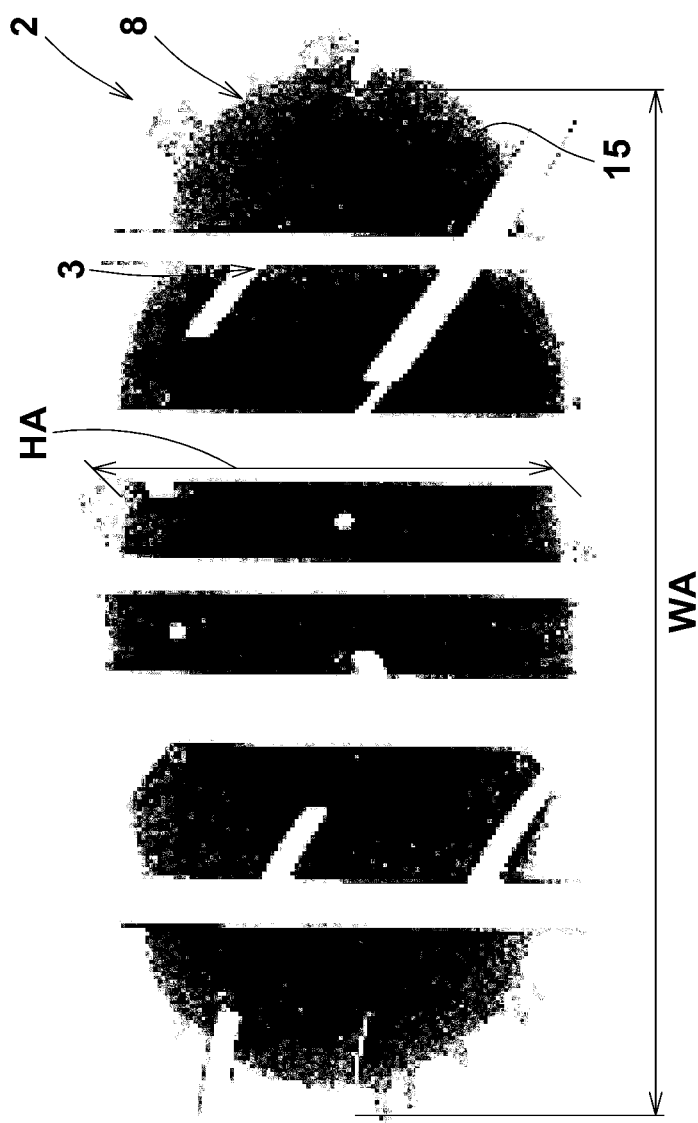
FIG. 3 is a footprint of the pneumatic tire of FIG. 1.

FIG. 3 shows a footprint of the tire 1 shown in FIG. 1 under the above-mentioned normally inflated loaded condition, wherein "HA" denotes the maximum ground-contacting length in the tire circumferential direction, and "WA" denotes the maximum ground-contacting width in the tire axial direction.

The inboard semi-open shoulder lateral grooves 15 are arranged in the tire circumferential direction at a pitch P of not less than 20% of the maximum ground-contacting length HA in order to maintain a sufficient actual ground contacting area during running and thereby to prevent the grip performance of the inboard shoulder land portion 8 from decreasing and exert high limit performance. Preferably, the pitch P is not less than 30%, more preferably not less than 50%, still more preferably not less than 90% of the maximum ground-contacting length HA.

Preferably, the maximum ground-contacting length HA is set in a range of not more than 70% of the maximum ground-contacting width WA. If more than 70%, there is a possibility that the limit performance is deteriorated.

In each embodiment, two inboard shoulder sipes 16 are disposed between every two of the circumferentially adjacent inboard semi-open shoulder lateral grooves 15 in order to decrease the pattern rigidity of the inboard shoulder land portion 8. Therefore, the occurrence of sudden skidding of the inboard shoulder land portion 8 is reduced, and the vehicle control performance in critical running conditions is improved.

The axial length La of each of the inboard shoulder sipes 16 is preferably set in a range of not less than 10 mm, more preferably not less than 18 mm.

If the axial length La of the inboard shoulder sipe 16 is less than 10 mm, there is a possibility that the rigidity of the inboard shoulder land portion 8 is not effectively reduced to prevent the occurrence of sudden skidding.

The axial distance L2 between the inboard shoulder main groove 3 and the inner ends 16i of the inboard shoulder sipes 16 is preferably set in a range of not less than 80%, more preferably not less than 90%, but preferably not more than 125%, more preferably not more than 110% of the above-mentioned axial distance L1 of the inboard semi-open shoulder lateral grooves 15. If the distance L2 is less than 80% of the distance L1, there is a possibility that the grip performance of the inboard shoulder land portion 8 is decreased, and the limit performance is deteriorated.
If the distance L2 is more than 125% of the distance L1, there is a possibility that the pattern rigidity of the inboard shoulder land portion 8 is not mitigated effectively to improve the vehicle control performance in critical running conditions.

Figure 4:
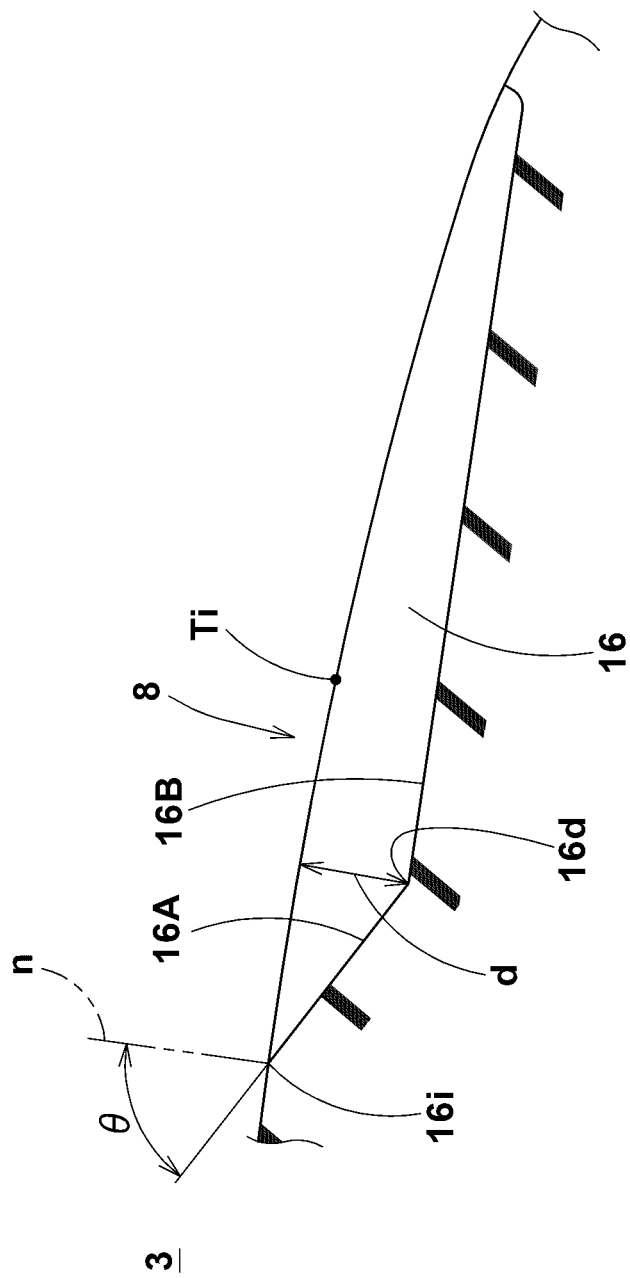
FIG. 4 is a cross-sectional view taken along the longitudinal direction of an inboard shoulder sipe.

FIG. 4 shows a cross-section along the widthwise center line of the inboard shoulder sipe 16.

In each embodiment, as shown in FIG. 4, the bottom of the inboard shoulder sipe 16 comprises an axially inner slope part 16A and an axially outer part 16B. The slope part 16A extends axially outwardly from the axially inner end 16i of the sipe 16 to the deepest portion 16d of the sipe. The axially outer part 16B extends axially outwardly from the deepest portion 16d.

The slope part 16A is inclined at a substantially constant angle theta of not less than 30 degree with respect to a normal line (n) drawn normally to the ground contacting top surface 8a of the inboard shoulder land portion 8 at the axially inner end 16i of the inboard shoulder sipe 16 in order to control the decrease in the pattern rigidity of the inboard shoulder land portion 8 in the vicinity of the inboard shoulder main groove 3 so that the high limiting performance is maintained.

The depth (d) of each inboard shoulder sipe 16 at the deepest portion 16d is set in a range from 50% to 100% of the depth of the inboard semi-open shoulder lateral grooves 15. If the depth (d) is less than 50%, there is a possibility that the pattern rigidity of the inboard shoulder land portion 8 is not reduced effectively to improve the vehicle control performance in critical running conditions.
If the depth (d) is more than 100%, there is a possibility that the grip performance of the inboard shoulder land portion 8 is decreased and the limit performance is deteriorated.

In the embodiment shown in FIG. 1, the above-mentioned inboard middle land portion 9 is provided with
  inboard open-ended middle lateral grooves 20 extending from the inboard shoulder main groove 3 to the inboard middle main groove 4, and
  inboard semi-open middle lateral grooves 21 extending from the inboard shoulder main groove 3 toward the inboard middle main groove 4 but terminating without reaching the inboard middle main groove 4.

The inboard open-ended middle lateral grooves 20 and the inboard semi-open middle lateral grooves 21 are inclined to one side in the tire circumferential direction towards the axially inside from the inboard shoulder main groove 3.
By the inboard middle lateral grooves 20 and 21, the pattern rigidity of the inboard middle land portion 9 is moderately mitigated, and the vehicle control performance in critical running conditions is improved.

With respect to positions in the tire circumferential direction, the inboard semi-open middle lateral grooves 21 are closer to the above-mentioned inboard semi-open shoulder lateral grooves 15 than the inboard open-ended middle lateral grooves 20. Thereby, the lateral rigidity of the combined land portions 8 and 9 is evened in the tire circumferential direction to help the improvement of the limit performance.

In order to effectively derive this advantage, it is preferred that the circumferential distances L3 between the axially outer ends 21e of the inboard semi-open middle lateral grooves 21 and the axially inner ends 15i of the inboard semi-open shoulder lateral grooves 15 are set in a range from 5% to 15% of the pitch P of the inboard semi-open shoulder lateral grooves 15.

Preferably, the axial length Lb of each of the inboard semi-open middle lateral grooves 21 is set to be not more than 60% of the axial width Wb of the inboard middle land portion 9 in order to reduce an influence on the grip performance of the inboard middle land portion 9.
Further, in order to appropriately mitigate the pattern rigidity of the inboard middle land portion 9, it is preferred that the length Lb of the inboard semi-open middle lateral groove 21 is not less than 40% of the axial width Wb of the inboard middle land portion 9.

The groove width W7 of the inboard open-ended middle lateral grooves 20 and the groove width W8 of the inboard semi-open middle lateral grooves 21 are gradually increased toward the inboard tread edge Ti in order that the pattern rigidity of the inboard middle land portion 9 is decreased more on the axially outside to further improve the vehicle control performance in critical running conditions.

It is preferable that the groove width W7 of the inboard open-ended middle lateral groove 20 and the groove width W8 of the inboard semi-open middle lateral groove 21 are set in a range from 5% to 25% of the axial width Wb of the inboard middle land portion 9 although not particularly limited to this range.

The depth of the inboard open-ended middle lateral grooves 20 and the depth of the inboard semi-open middle lateral grooves 21 are preferably set in a range from 50% to 100% of the depth of the main grooves.

As shown in FIG. 2, the acute angled corners 9C formed between the inboard open-ended middle lateral grooves 20 and the inboard middle main groove 4 are each provided with a chamfer 22 or slant surface extending from the ground contacting top surface 9a of the inboard middle land portion 9.

Figure 5:
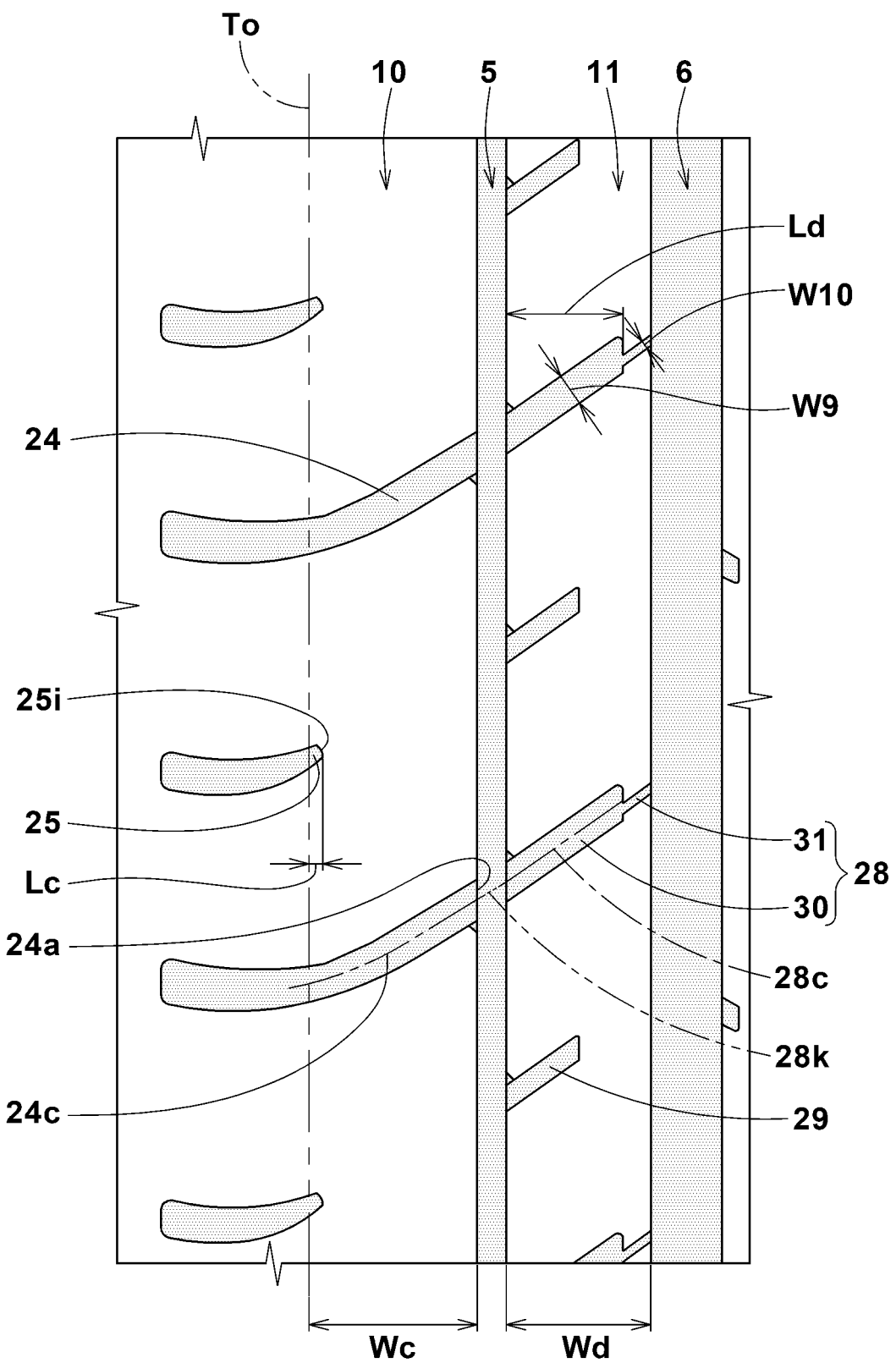
FIG. 5 is an enlarged view showing the outboard shoulder land portion and the outboard middle land portion of FIG. 1.

FIG. 5 shows the outboard shoulder land portion 10 and the outboard middle land portion 11 of the embodiment shown in FIG. 1. As shown, the outboard shoulder land portion 10 is provided with outboard shoulder lateral grooves 24 and outboard semi-open shoulder lateral grooves 25.

The outboard shoulder lateral grooves 24 extend axially outwardly from the outboard shoulder main groove 5 to and beyond the outboard tread edge To.

The outboard semi-open shoulder lateral grooves 25 extend axially outwardly beyond the outboard tread edge To from the respective axially inner ends 25i at an axial position in the outboard shoulder land portion 10 near the outboard tread edge To.

The axial length Lc of each of the outboard semi-open shoulder lateral grooves 25 is in a range from 2% to 10% of the axial width Wc of the outboard shoulder land portion 10. If the axial length Lc is less than 2% of the axial width Wc, there is a possibility that the pattern rigidity of the outboard shoulder land portion 10 is not mitigated and the vehicle control performance in critical running conditions is deteriorated. If the axial length Lc is more than 10% of the axial width Wc, there is a possibility that the pattern rigidity of the outboard shoulder land portion 10 is decreased and the limit performance is deteriorated.

The outboard shoulder lateral grooves 24 and the outboard semi-open shoulder lateral grooves 25 are inclined to one side in the tire circumferential direction toward the axially inside from the outboard tread edge To. By configuring the lateral grooves 24 and 25 as above, a high circumferential rigidity of the outboard shoulder land portion 10 is maintained.

The outboard middle land portion 11 is provided with outboard open-ended middle lateral grooves 28 and outboard semi-open middle lateral grooves 29.

The outboard open-ended middle lateral grooves 28 extend from the outboard shoulder main groove 5 to the outboard middle main groove 6.

The outboard semi-open middle lateral grooves 29 extend axially inwardly from the outboard shoulder main groove 5 and terminate without reaching the outboard middle main groove 6.

The outboard open-ended middle lateral grooves 28 and the outboard semi-open middle lateral grooves 29 are inclined to one side in the tire circumferential direction towards the tire equator C from the outboard shoulder main groove 5. Thereby, a high circumferential rigidity of the outboard middle land portion 11 is maintained.

Each of the outboard open-ended middle lateral grooves 28 is aligned with one of the outboard shoulder lateral grooves 24 so that the two grooves 28 and 24 seem to be one groove continuous across the outboard shoulder main groove 5. This improves the limit performance on wet roads. Here, the expression "seem to be one groove" encompasses such a condition that a smoothly extended line 28k of the widthwise center line 28c of the outboard open-ended middle lateral groove 28 overlaps with the widthwise center line 24c of the outboard shoulder lateral groove 24, as well as
such a condition that the smoothly extended line 28k is positioned within the opening width of the axially inner end 24a of the outboard shoulder lateral groove 24, in other words, at the axially inner end 24a, the smoothly extended line 28k intersects with the widthwise center line 24c for example at an obtuse intersecting angle.

Each of the outboard open-ended middle lateral grooves 28 is composed of an axially outer wide portion 30 extending axially inwardly from the outboard shoulder main groove 5, and an axially inner narrow portion 31 extending from the axially outer wide portion 30 to the outboard middle main groove 6. By the axially outer wide portions 30, the pattern rigidity of the outboard middle land portion 11 is reduced on the outboard tread edge To side, and thereby the vehicle control performance in critical running conditions is improved.

In order to effectively derive this advantage, the axial length Ld of the axially outer wide portion 30 is preferably set in a range of not less than 70% of the axial width Wd of the outboard middle land portion 11. In order to control the decrease in the grip performance of the outboard middle land portion 11, the axial length Ld is preferably less than 90% of the axial width Wd.

The groove width W9 of the axially outer wide portion 30 is preferably set in a range from 3 to 7 times the groove width W10 of the axially inner narrow portion 31. Preferably, the groove width W9 is set in a range from 15% to 30% of the axial width Wd of the outboard middle land portion 11.

In the embodiment shown in FIG. 1, as described above, the semi-open lateral grooves 15, 21, 25 and 29 of the middle land portions 9 and 11 and the shoulder land portions 8 and 10 are closed at the respective inner ends. Therefore, the pattern rigidity of the land portions 8-11 is mitigated on the respective axial outer sides, and the vehicle control performance in critical running conditions is effectively improved.

The above-mentioned inboard crown land portion 12 is provided with inboard semi-open crown lateral grooves 35 extending axially inwardly from the inboard middle main groove 4 and terminating without reaching the crown main groove 7.

The outboard crown land portion 13 is provided with outboard semi-open crown lateral grooves 36 extending axially inwardly from the outboard middle main groove 6 and terminating without reaching the crown main groove 7.

Figure 6:
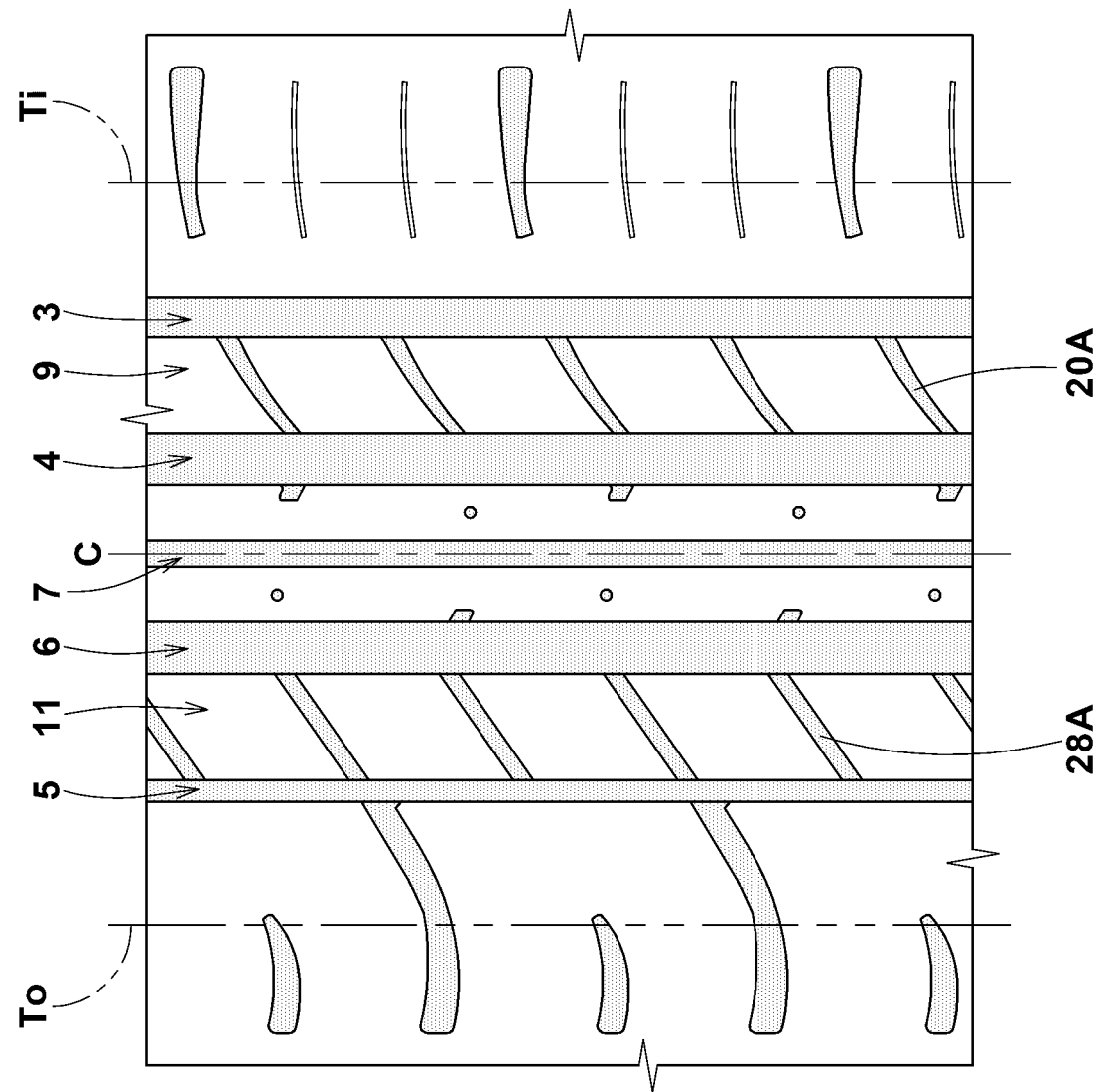
FIGS. 6, 7, 8 and 9 are development views of tread portions of pneumatic tires as further embodiments of the present invention.

In the embodiment shown in FIG. 6, the inboard middle land portion 9 is provided with only a plurality of inboard open-ended middle lateral grooves 20A extending from the inboard shoulder main groove 3 to the inboard middle main groove 4. Also, the outboard middle land portion 11 is provided with only a plurality of outboard open-ended middle lateral grooves 28A extending from the outboard shoulder main groove 5 to the outboard middle main groove 6.

Figure 7:
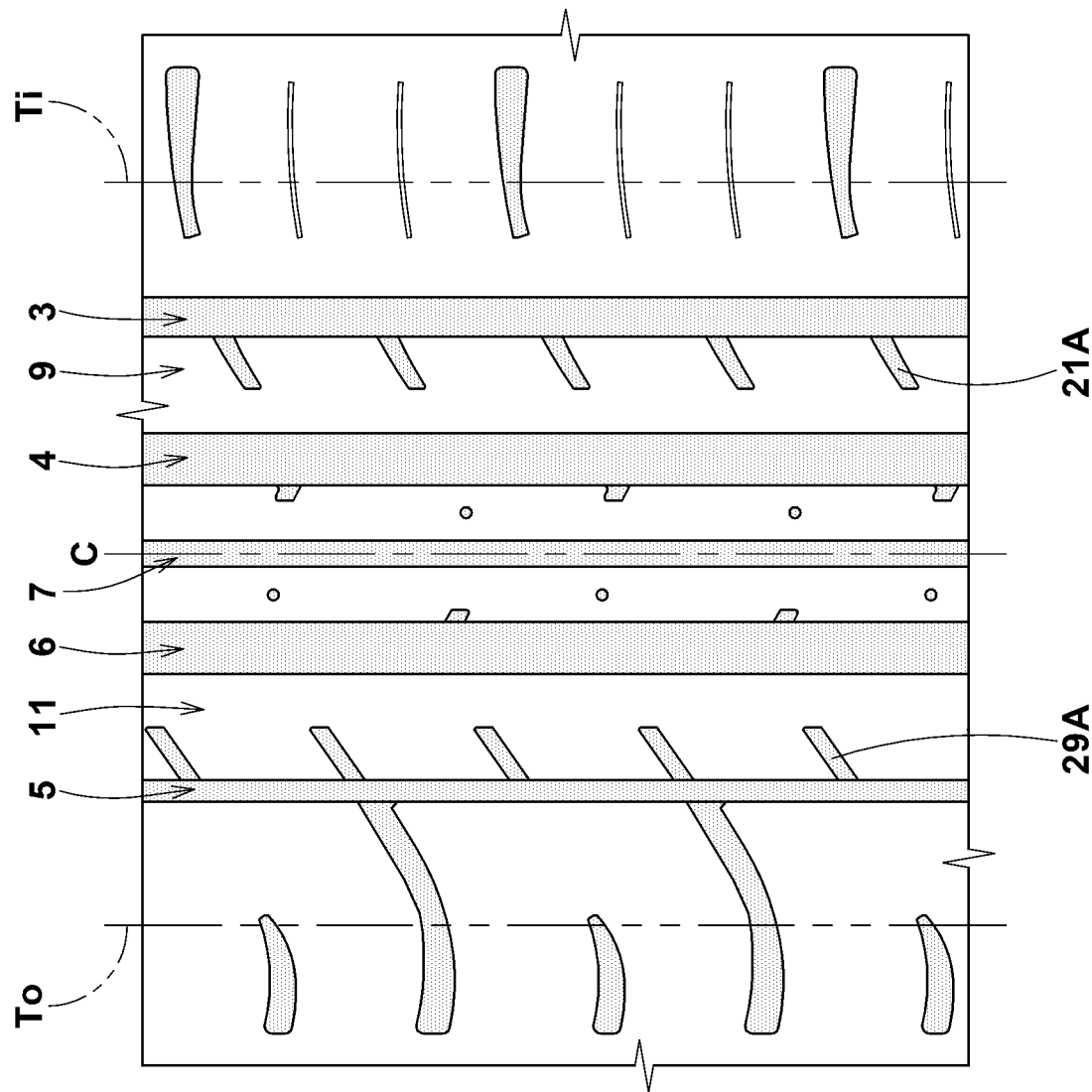

In the embodiment shown in FIG. 7, the inboard middle land portion 9 is provided with only a plurality of inboard semi-open middle lateral grooves 21A extending axially inwardly from the inboard shoulder main groove 3 and terminating without reaching the inboard middle main groove 4.
Also, the outboard middle land portion 11 is provided with only a plurality of outboard semi-open middle lateral grooves 29A extending axially inwardly from the outboard shoulder main groove 5 and terminating without reaching the outboard middle main groove 6.

Figure 8:
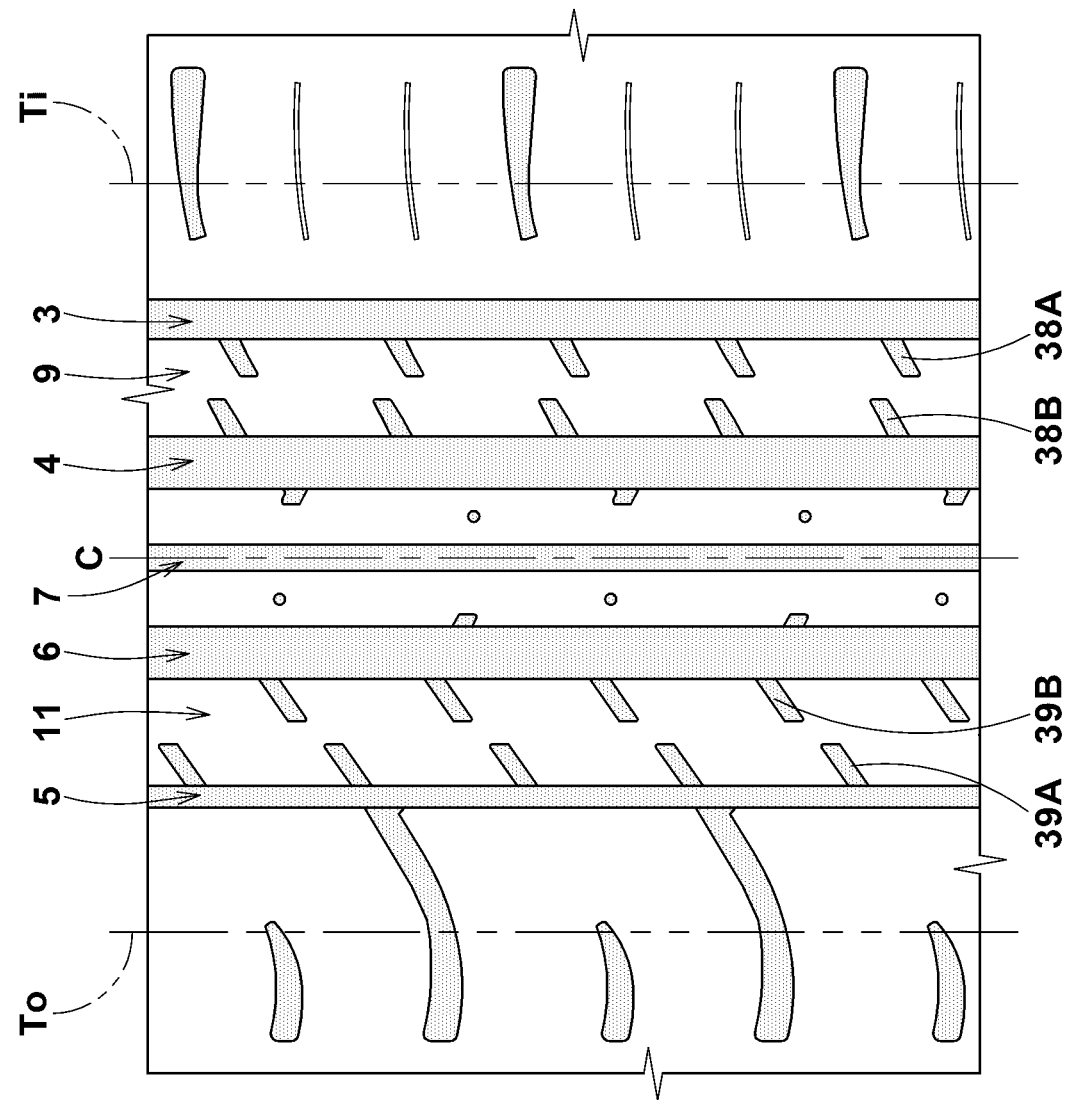

In the embodiment shown in FIG. 8, the inboard middle land portion 9 is provided with inboard semi-open middle lateral grooves which are first inboard semi-open middle lateral grooves 38A and second inboard semi-open middle lateral grooves 38B. The first inboard semi-open middle lateral grooves 38A extend axially inwardly from the inboard shoulder main groove 3 and terminate without reaching the inboard middle main groove 4. The second inboard semi-open middle lateral grooves 38B extend axially outwardly from the inboard middle main groove 4 and terminate without reaching the inboard shoulder main groove 3. Similarly, the outboard middle land portion 11 is provided with outboard semi-open middle lateral grooves which are first outboard semi-open middle lateral grooves 39A and second outboard semi-open middle lateral grooves 39B.
The first outboard semi-open middle lateral grooves 39A extend axially inwardly from the outboard shoulder main groove 5 and terminate without reaching the outboard middle main groove 6. The second outboard semi-open middle lateral grooves 39B extend axially outwardly from the outboard middle main groove 6 and terminate without reaching the outboard shoulder main groove 5.

Figure 9:
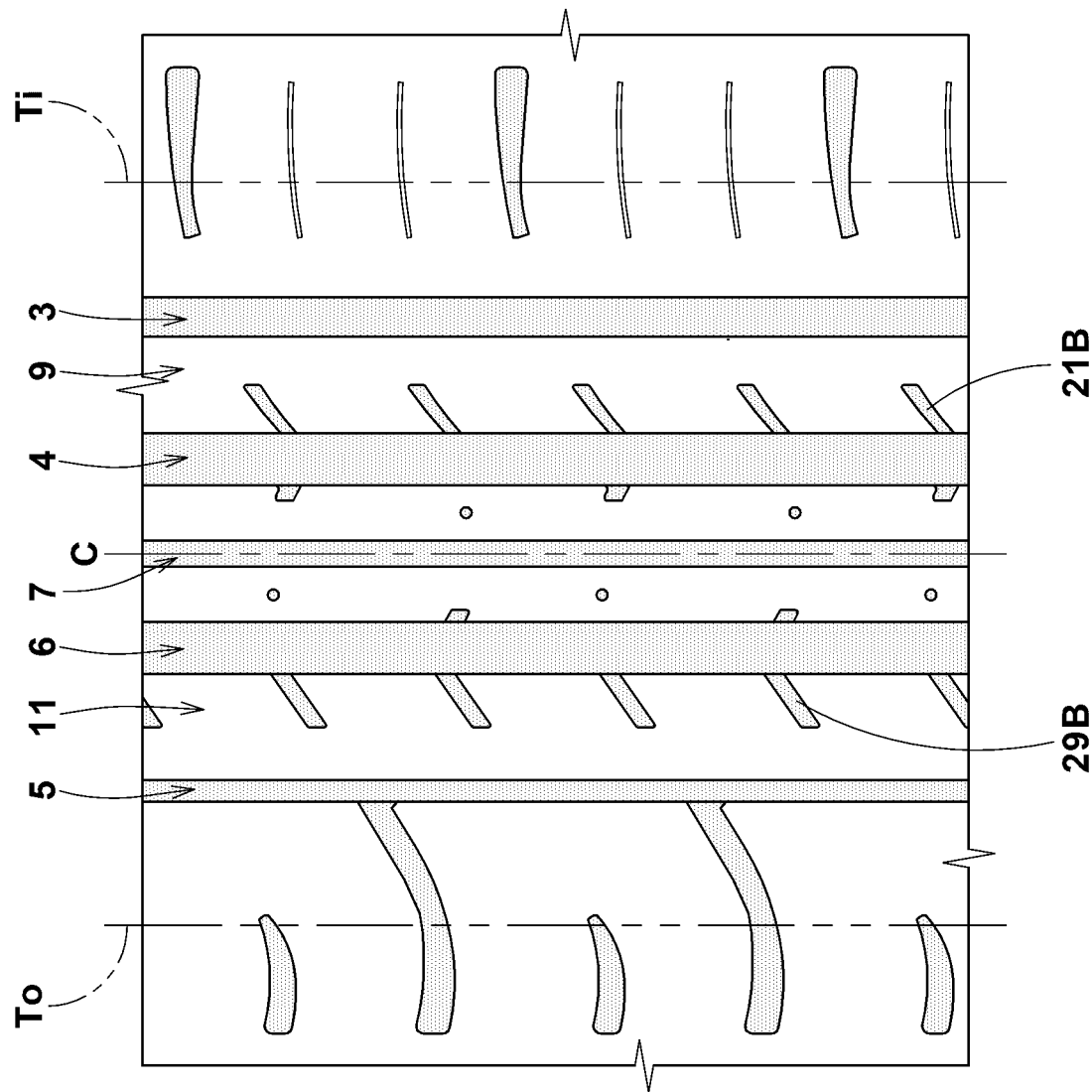

In the embodiment shown in FIG. 9, the inboard middle land portion 9 is provided with only a plurality of inboard semi-open middle lateral groove 21B extending axially outwardly from the inboard middle main groove 4 and terminating without reaching the inboard shoulder main groove 3.

Also, the outboard middle land portion 11 is provided with only a plurality of outboard semi-open middle lateral grooves 29B extending axially outwardly from the outboard middle main groove 6 and terminating without reaching the outboard shoulder main groove 5.

While detailed description has been made of preferable embodiments of the present invention, the present invention can be embodied in various forms without being limited to the illustrated embodiments.

Comparison Tests

Based on the tread pattern shown in FIG. 1, test tires of size 285/35R19 (rim size 10.5 J) having the specifications shown in Table 1 were experimentally manufactured and tested for the limit performance and the vehicle control performance.

Common specifications are as follows.
inboard and outboard middle main grooves' depth: 7.0 mm
inboard and outboard shoulder main grooves' depth: 6.8 mm
crown main groove's depth: 4.9 mm
inboard semi-open shoulder lateral grooves' depth (max.): 4.9 mm
inboard semi-open middle lateral grooves' depth: 4.9 mm
inboard open-ended middle lateral grooves' depth: 3.3 mm (inner side)-4.9 mm (outer side)
distance L2+length La of inboard shoulder sipe: 40 mm <Limit Performance and Vehicle Control Performance>

The test tires were attached to the rear wheels of a 3500 cc rear-drive sports car and run on a dry asphalt road surface of a tire test course. (tire pressure 240 kPa)

During running, the test driver evaluated limit performance and vehicle control performance based on running characteristics relating to the steering stability such as traction performance, and cornering performance in critical running conditions, and maneuverability (steering response) in nearly critical running conditions.

The test results are indicated in Table 1 by an index based on the comparative example tire Ref being 100, wherein the larger value, the better the performance.

TABLE 1

| Tire | Ref | Conv | Ex1 | Ex2 | Ex3 | Ex4 |
|---|---|---|---|---|---|---|
| inboard shoulder sipe | none | none (groove) | | | | |
| width (mm) | — | 5 | 0.5 | 1 | 0.5 | 0.5 |
| length La (mm) | — | 20 | 20 | 20 | 5 | 10 |
| distance L2/L1 (%) | — | 100 | 100 | 100 | 100 | 100 |
| depth d (%) | — | 80 | 80 | 80 | 80 | 80 |
| slope angle theta (deg.) | — | 40 | 40 | 40 | 40 | 40 |
| vehicle control performance | 100 | 110 | 120 | 120 | 110 | 115 |
| limit performance | 100 | 90 | 99 | 98 | 100 | 100 |

| Tire | Ex5 | Ex6 | Ex7 | Ex8 | Ex9 | Ex10 |
|---|---|---|---|---|---|---|
| inboard shoulder sipe | | | | | | |
| width (mm) | 0.5 | 0.5 | 0.5 | 0.5 | 0.5 | 0.5 |
| length La (mm) | 20 | 20 | 20 | 20 | 20 | 20 |
| distance L2/L1 (%) | 70 | 140 | 100 | 100 | 100 | 100 |
| depth d (%) | 80 | 80 | 40 | 120 | 80 | 80 |
| slope angle theta (deg.) | 40 | 40 | 40 | 40 | 20 | 60 |
| vehicle control performance | 122 | 116 | 110 | 120 | 120 | 115 |
| limit performance | 96 | 100 | 100 | 95 | 95 | 99 |

From the test results, it was confirmed that, as compared with the comparative example tire, the tires according to the present invention were improved in the limit performance and vehicle control performance in good balance.

DESCRIPTION OF THE REFERENCE SIGNS

1 Pneumatic tire
3 Inboard shoulder main groove
8 Inboard shoulder land portion
15 Inboard semi-open shoulder lateral groove
15i Axially inner end of inboard semi-open shoulder lateral groove
16 Inboard shoulder sipe
16i Axially inner end of inboard shoulder sipe
Ti Inboard tread edge

The invention claimed is:

1. A pneumatic tire comprising:
a tread portion having an outboard tread edge to be positioned away from the center of a vehicle body and an inboard tread edge to be positioned close to the center of the vehicle body,
wherein a maximum ground-contacting length in a tire circumferential direction of the tread portion under a normally inflated loaded condition of the tire is not more than 70% of a maximum ground-contacting width in the tire axial direction of the tread portion under the normally inflated loaded condition of the tire,
wherein the tread portion is provided with main grooves extending continuously in the tire circumferential direction, and includes an inboard shoulder main groove which is disposed on the most inboard tread edge side, an outboard shoulder main groove which is disposed on the most outboard tread edge side, and an inboard middle main groove and an outboard middle main groove which are disposed between the inboard and outboard shoulder main grooves, respectively,
wherein the inboard shoulder main groove is larger in a groove width than the outboard shoulder main groove,
wherein an inboard shoulder land portion, defined between the inboard tread edge and the inboard shoulder main groove, is provided with inboard shoulder lateral grooves, which are arranged in the tire circumferential direction. and an outboard shoulder land portion defined between the outboard tread edge and the outboard shoulder main groove, the outboard shoulder land portion is provided with outboard shoulder lateral grooves which are arranged in the tire circumferential direction,
wherein
each of the inboard shoulder lateral grooves is an independent groove extending from the inboard tread edge toward the inboard shoulder main groove but terminating without reaching the inboard shoulder main groove so as to have an axially inner end within the inboard shoulder land portion, whereas each of the outboard shoulder lateral grooves extends across the entire width of the outboard shoulder land portion so as to connect to the outboard shoulder main groove,
the inboard shoulder lateral grooves are arranged in the tire circumferential direction at a pitch of not less than 20% of said maximum ground-contacting length, and wherein
sipes each having a groove width of not more than 1 mm are disposed in the inboard shoulder land portion. whereas a sipe having a groove width of not more than 1 mm is not disposed in the outboard shoulder land portion, the sipes disposed in the inboard shoulder land portion are inboard shoulder sipes, which extend axially inwardly from the inboard tread edge and terminate without reaching the inboard shoulder main groove so as to have axially inner ends within the inboard shoulder land portion, and the inboard shoulder sipes are disposed between the independent inboard shoulder lateral grooves.

2. The pneumatic tire according to claim 1, wherein each of the inboard shoulder sipes is an independent sipe, and at least two of the inboard shoulder sipes are disposed between every two of the circumferentially adjacent inboard shoulder lateral grooves.

3. The pneumatic tire according to claim 1, wherein axial lengths of the inboard shoulder sipes are not less than 10 mm.

4. The pneumatic tire according to claim 1, wherein the axial distance between the inboard shoulder main groove and the axially inner ends of the inboard shoulder lateral grooves is not less than 10 mm.

5. The pneumatic tire according to-claim 1, wherein the depth of the inboard shoulder sipes is in a range from 50% to 100% of the depth of the inboard shoulder lateral grooves.

6. The pneumatic tire according to claim 1, wherein the bottom of each of the inboard shoulder sipes comprises a slope part which extends from the axially inner end of the inboard shoulder sipe at the ground contacting top surface of the inboard shoulder land portion to the deepest position of the inboard shoulder sipe, and the slope part is inclined at an angle of not less than 30 degrees with respect to a normal line drawn normally to the ground contacting top surface of the inboard shoulder land portion at the axially inner end of the inboard shoulder sipe in a cross section along the longitudinal direction of the inboard shoulder sipe.

7. The pneumatic tire according to claim 1, wherein groove widths of the inboard shoulder lateral grooves are gradually increased toward the axially outside from the respective axial inner ends.

8. The pneumatic tire according to claim 1, wherein the axial distance between the inboard shoulder main groove and the axial inner ends of the inboard shoulder sipes is in a range from 80% to 125% of the axial distance between the inboard shoulder main groove and the axial inner ends of the inboard shoulder lateral grooves.

9. The pneumatic tire according to claim 1, wherein an inboard middle land portion defined between the inboard shoulder main groove and the inboard middle main groove which is next to the inboard shoulder main groove, is provided with inboard open-ended middle lateral grooves extending from the inboard shoulder main groove to the inboard middle main groove, and inboard semi-open middle lateral grooves extending from the inboard shoulder main groove toward the inboard middle main groove but terminating without reaching the inboard middle main groove, and the inboard semi-open middle lateral grooves are closer to the inboard semi open shoulder lateral grooves than the inboard open-ended middle lateral grooves.

10. The pneumatic tire according to claim 1, wherein the groove width of the inboard shoulder main groove is in a range from 3% to 7% of a tread width between the outboard tread edge and the inboard tread edge.

11. The pneumatic tire according to claim 2, wherein axial lengths of the inboard shoulder sipes are not less than 10 mm.

12. The pneumatic tire according to claim 2, wherein the axial distance between the inboard shoulder main groove and the axially inner ends of the inboard semi pen shoulder lateral grooves is not less than 10 mm.

13. The pneumatic tire according to claim 3, wherein the axial distance between the inboard shoulder main groove and the axially inner ends of the inboard shoulder lateral grooves is not less than 10 mm.

14. The pneumatic tire according to claim 9, wherein the inboard semi-open middle lateral grooves and the inboard open-ended middle lateral grooves are alternately arranged in the tire circumferential direction.

15. The pneumatic tire according to claim 14, wherein an outboard middle land portion defined between the outboard shoulder main groove and the outboard middle main groove is provided with outboard middle lateral grooves, and the outboard middle lateral grooves are:

outboard semi-open middle lateral grooves each extending from the outboard shoulder main groove toward the outboard middle main groove but terminating without reaching the outboard middle main groove, and outboard open-ended middle lateral grooves each extending from the outboard shoulder main groove to the outboard middle main groove.

16. The pneumatic tire according to claim 15, wherein the outboard open-ended middle lateral grooves and the outboard semi-open middle lateral grooves are arranged alternately in the tire circumferential direction.

17. The pneumatic tire according to claim 16, wherein the outboard open-ended middle lateral grooves and the outboard semi-open middle lateral grooves are inclined to one direction with respect to the tire axial direction.

18. The pneumatic tire according to claim 17, wherein the outboard open-ended middle lateral grooves are aligned with the respective outboard shoulder lateral grooves.

19. The pneumatic tire according to claim 17, wherein the inboard open-ended middle lateral grooves and the inboard semi-open middle lateral grooves are inclined with respect to the tire axial direction to the same direction as the outboard open-ended middle lateral grooves and the outboard semi-open middle lateral grooves.

20. The pneumatic tire according to claim 15, wherein the main grooves include a crown main groove disposed on the tire equator, and an outboard crown and portion defined between the outboard middle main groove and the crown main groove, and an inboard crown land portion defined between the inboard middle main groove and the crown main groove are each formed as a circumferentially continuous rib.

* * * * *